(12) United States Patent
Matsuda et al.

(10) Patent No.: US 11,077,881 B2
(45) Date of Patent: Aug. 3, 2021

(54) LOWER VEHICLE BODY STRUCTURE FOR VEHICLE

(71) Applicant: MAZDA MOTOR CORPORATION, Hiroshima (JP)

(72) Inventors: Yamato Matsuda, Hiroshima (JP); Nobuyuki Nakayama, Aki-gun (JP); Shuji Muraoka, Iwakuni (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 91 days.

(21) Appl. No.: 16/491,515

(22) PCT Filed: Feb. 21, 2018

(86) PCT No.: PCT/JP2018/006123
§ 371 (c)(1),
(2) Date: Sep. 5, 2019

(87) PCT Pub. No.: WO2018/163815
PCT Pub. Date: Sep. 13, 2018

(65) Prior Publication Data
US 2020/0031399 A1 Jan. 30, 2020

(30) Foreign Application Priority Data
Mar. 10, 2017 (JP) .............................. JP2017-045617

(51) Int. Cl.
*B62D 21/15* (2006.01)
*B60K 1/04* (2019.01)
(Continued)

(52) U.S. Cl.
CPC .............. *B62D 21/157* (2013.01); *B60K 1/04* (2013.01); *B62D 21/03* (2013.01);
(Continued)

(58) Field of Classification Search
CPC .. B62D 21/157; B62D 21/03; B62D 25/2036; B60K 1/04; B60K 2001/0438;
(Continued)

(56) References Cited

U.S. PATENT DOCUMENTS 8,919,466 B2 * 12/2014 Suzuki ..................... B60K 1/04
180/65.21
2009/0066118 A1 3/2009 Tosaka et al.
(Continued)

FOREIGN PATENT DOCUMENTS

EP    2 011 719 A2   1/2009
JP    2013103635 A   5/2013
(Continued)

OTHER PUBLICATIONS

International Search Report issued in PCT/JP2018/006123; dated May 1, 2018.
(Continued)

*Primary Examiner* — Lori L Lyjak
(74) *Attorney, Agent, or Firm* — Studebaker & Brackett PC

(57) ABSTRACT

A lower vehicle body structure for a vehicle includes a floor panel, a pair of side frames, a battery, a left and right pair of side sills, a cross-member, an impact absorption member, and a reinforcement member. The impact absorption member is disposed at a lower surface side of the floor panel and at a position overlapping the cross-member in a front-rear direction of the vehicle body so as to extend in a vehicle width direction between the side frames and the side sills. Also, the impact absorption member is joined to the side frames and the side sills. The reinforcement member is disposed in the cross-member to extend in the vehicle width (Continued)

direction between portions of the cross-member, which correspond to the left and right pair of side frames in the vehicle width direction.

7 Claims, 13 Drawing Sheets

(51) Int. Cl.
    *B62D 21/03*      (2006.01)
    *B62D 25/20*      (2006.01)
    *B60L 50/60*      (2019.01)

(52) U.S. Cl.
    CPC .. *B62D 25/2036* (2013.01); *B60K 2001/0438* (2013.01); *B60L 50/66* (2019.02); *B60Y 2200/91* (2013.01)

(58) Field of Classification Search
    CPC ..... B60L 50/66; B60Y 2200/91; B60R 21/04; B60R 2021/0414; B60R 2021/0435
    See application file for complete search history.

(56) References Cited

U.S. PATENT DOCUMENTS

| | | |
|---|---|---|
| 2013/0229030 A1 | 9/2013 | Yamaguchi et al. |
| 2016/0311301 A1 | 10/2016 | Ikeda et al. |
| 2017/0210427 A1* | 7/2017 | Akhlaque-e-rasul ........................ B62D 25/025 |

FOREIGN PATENT DOCUMENTS

| | | |
|---|---|---|
| JP | 2015074239 A | 4/2015 |
| JP | 5870992 B2 | 3/2016 |
| WO | 2012063393 A1 | 5/2012 |

OTHER PUBLICATIONS

The extended European search report issued by the European Patent Office dated Feb. 5, 2020, which corresponds to European Patent Application No. 18763691.5-1009 and is related to U.S. Appl. No. 16/491,515.

* cited by examiner

LOWER VEHICLE BODY STRUCTURE FOR VEHICLE

TECHNICAL FIELD

The present disclosure relates to a lower vehicle body structure for a vehicle.

BACKGROUND ART

As a vehicle such as an electric car equipped with a motor as a drive source which drives a vehicle and with a battery which stores electric power to be supplied to the motor, in a case where the battery has a large size and heavy weight, it is known to dispose the battery below a floor panel forming a floor surface of a vehicle compartment and between a left and right pair of side frames disposed at a lower surface side of the floor panel so as to be spaced apart in a vehicle width direction.

For example, Patent Literature 1 discloses providing a vehicle, in which a battery is disposed below a floor panel and between side frames, with a battery frame which supports the battery disposed below the floor panel, and an energy absorption member disposed on a vehicle-widthwise outer side of the battery frame so that the battery frame and the energy absorption member have their opposed surfaces formed in parallel to each other.

CITATION LIST

Patent Literature

Patent Literature 1: Japanese Patent No. 5870992

SUMMARY OF INVENTION

In recent years, for a vehicle such as an electric car in which a battery is disposed below a floor panel and between side frames for the purpose of improving safety of the vehicle, it is demanded for further improving battery protection performance by suppressing damage of the battery when at the time of side-on collision with a utility pole or the like (side-on collision with a pole), a collision load acts on a side sill from vehicle-widthwise outer sides.

Under these circumstances, an object of the present disclosure is to provide, in a vehicle where a battery is disposed below a floor panel, a lower vehicle body structure for a vehicle which enables improvement in battery protection performance at the time of side-on collision.

A lower vehicle body structure for a vehicle according to one aspect of the present disclosure includes a floor panel forming a floor surface of a vehicle compartment; a left and right pair of side frames disposed at a lower surface side of the floor panel so as to be spaced apart in a vehicle width direction and extending in a front-rear direction of the vehicle body; a battery disposed below the floor panel and between the left and right pair of side frames; a left and right pair of side sills respectively joined to vehicle-widthwise both end portions of the floor panel and arranged on vehicle-widthwise outer sides of the left and right pair of side frames to extend in the front-rear direction of the vehicle body; a cross-member disposed on an upper surface side of the floor panel to extend in the vehicle width direction between the left and right pair of side sills; an impact absorption member which is disposed at the lower surface side of the floor panel and at a position overlapping the cross-member in the front-rear direction of the vehicle body to extend in the vehicle width direction between the side frames and the side sills and is also joined to the side frames and the side sills to absorb an impact load input from the vehicle-widthwise outer side; and a reinforcement member disposed in the cross-member to extend in the vehicle width direction between portions of the cross-member, which correspond to the left and right pair of side frames in the vehicle width direction.

DESCRIPTION OF EMBODIMENTS

Figure 1:
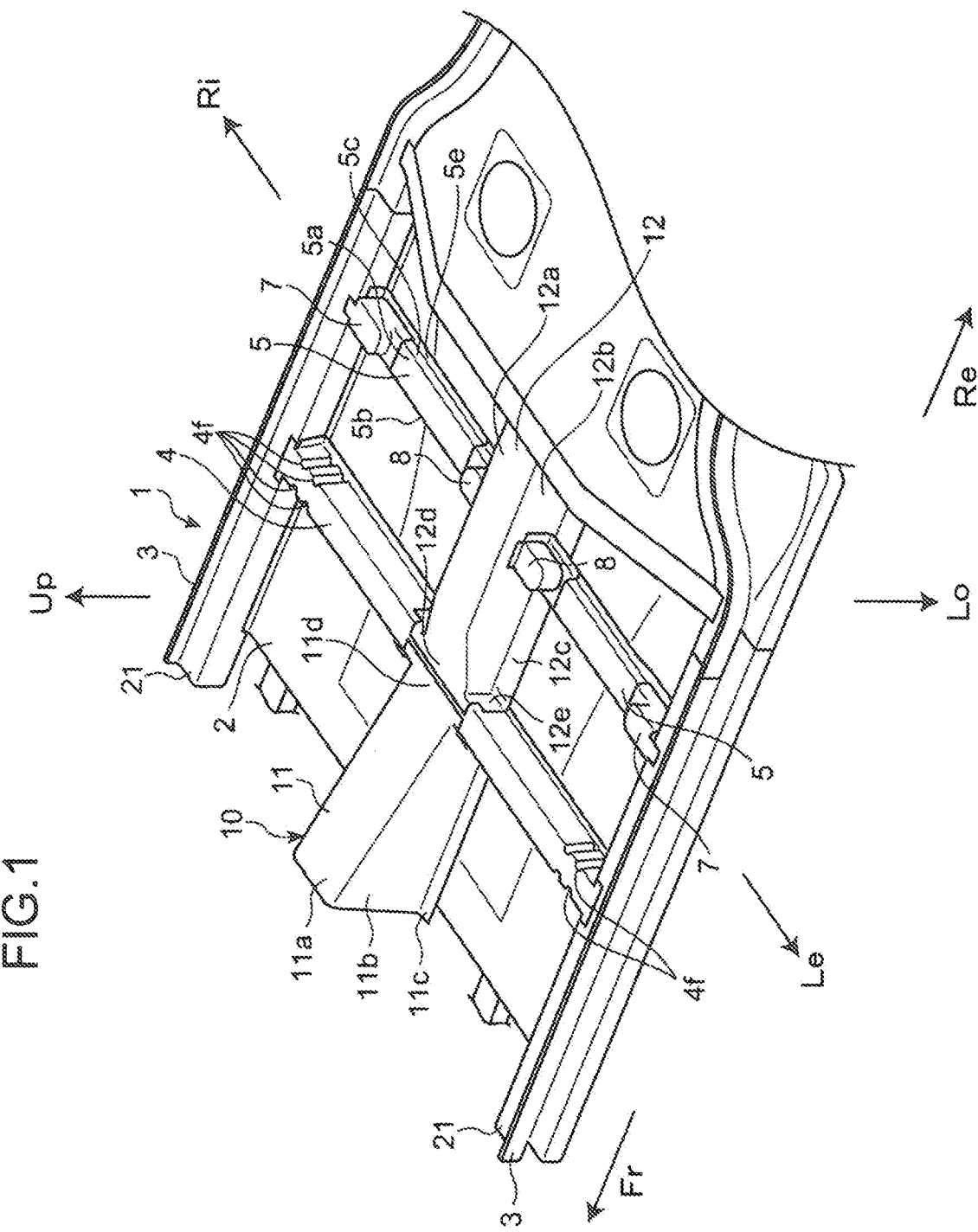
FIG. 1 is a perspective view of a lower vehicle body structure for a vehicle according to an embodiment viewed from obliquely above.

In the following, an embodiment will be described with reference to the accompanying drawings.

In the drawings, "Up" represents a vehicle body upper side, "Lo" represents a vehicle body lower side, "Fr" represents a vehicle body front side, "Re" represents a vehicle body rear side, "Le" represents a vehicle body left side, "Ri" represents a vehicle body right side, "In" represents a vehicle inner side, and "Out" represents a vehicle outer side.

Figure 2:
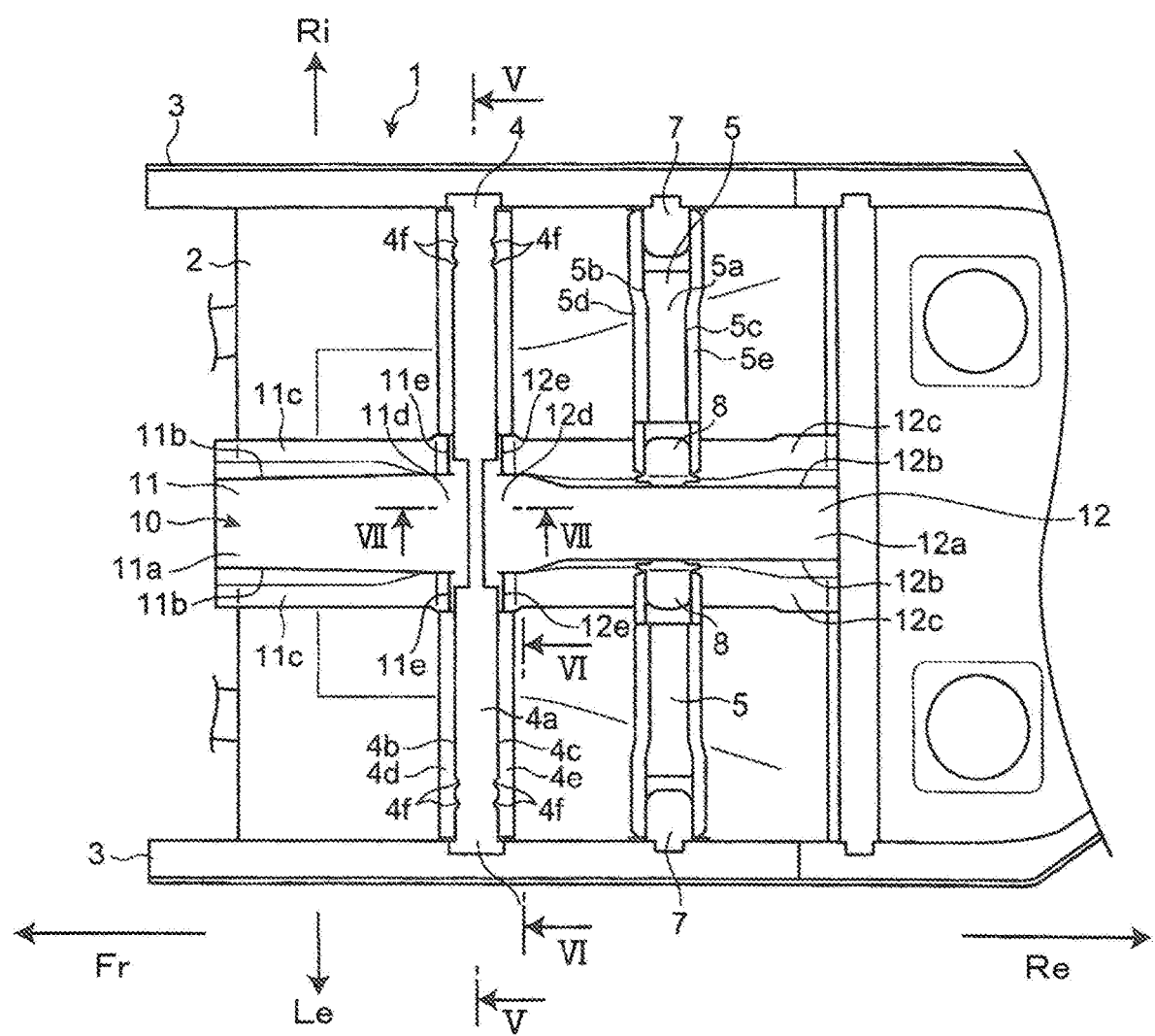
FIG. 2 is a top view of the lower vehicle body structure for a vehicle according to the embodiment viewed from above.
Figure 3:
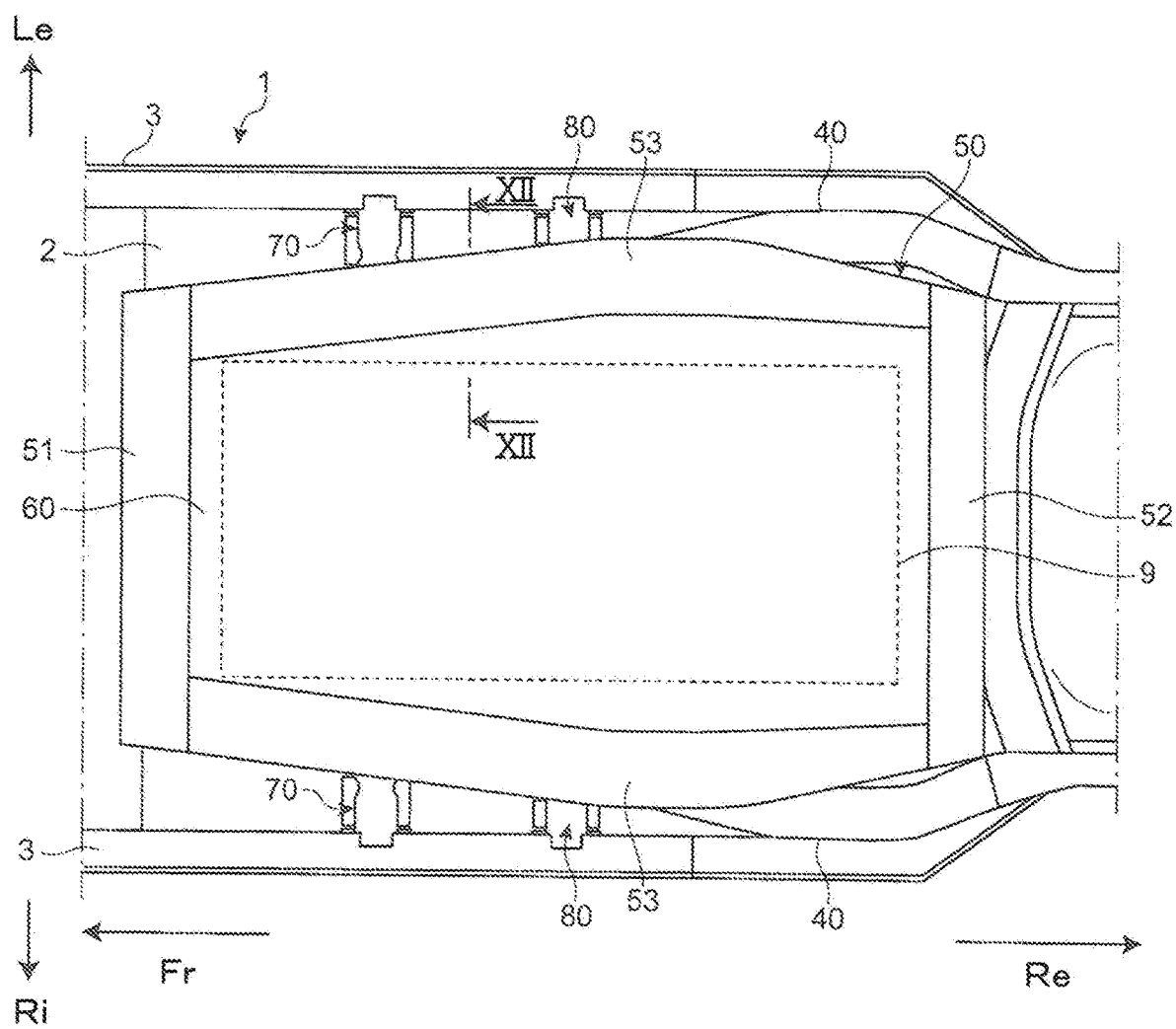
FIG. 3 is a bottom view of the lower vehicle body structure for a vehicle according to the embodiment viewed from below.
Figure 4:
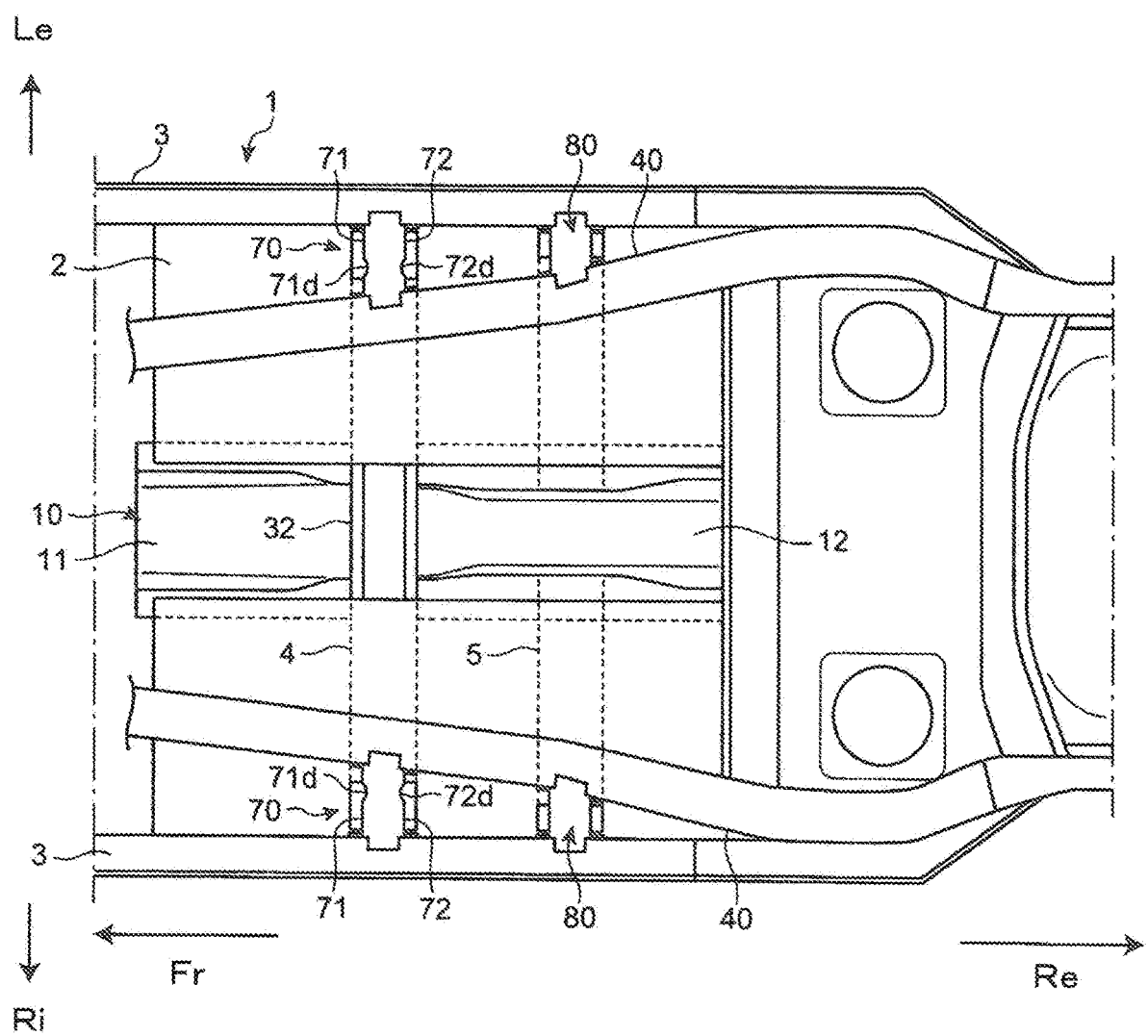
FIG. 4 is a bottom view of the lower vehicle body structure for a vehicle according to the embodiment viewed from below with a battery and a battery frame removed.
Figure 5:
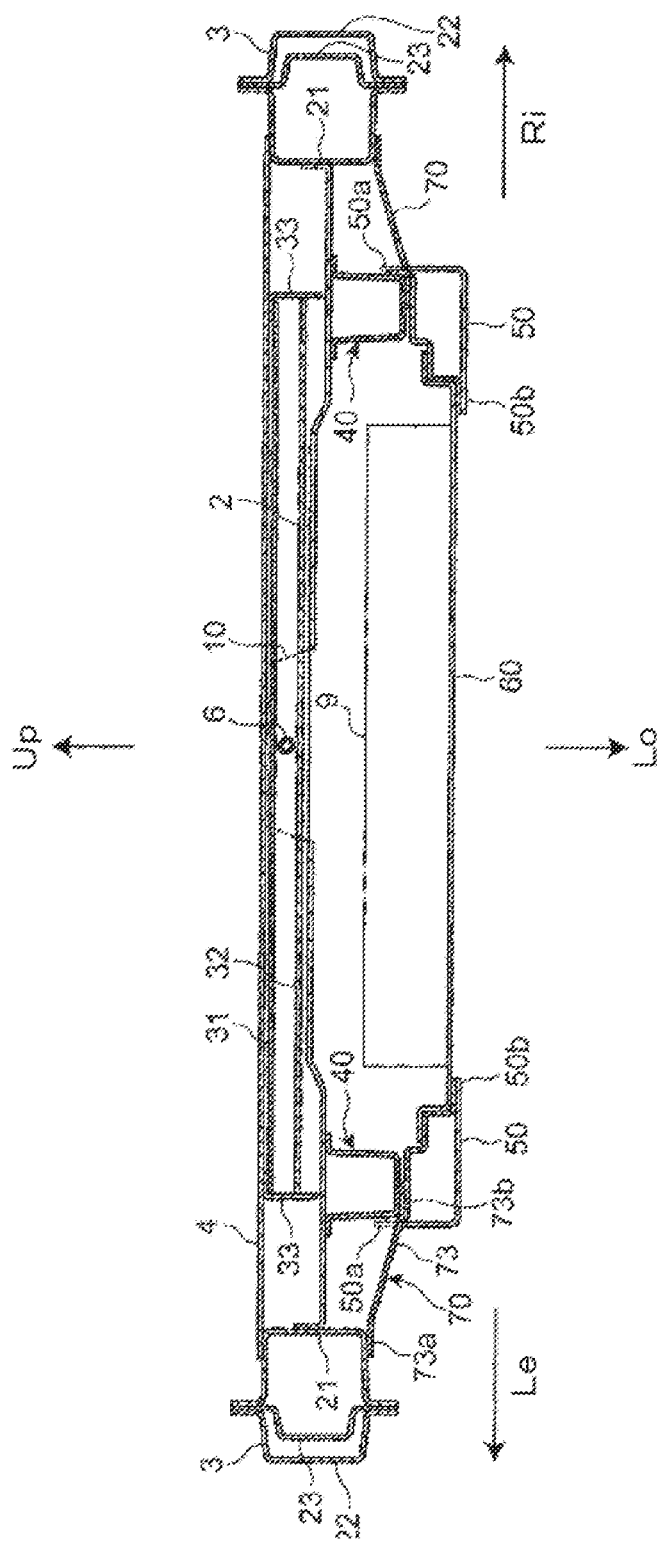
FIG. 5 is a sectional view showing a cross-section of the lower vehicle body structure taken along line V-V in FIG. 2.

FIG. 1 is a perspective view of a lower vehicle body structure for a vehicle according to an embodiment viewed from obliquely above, FIG. 2 is a top view of the lower vehicle body structure for a vehicle viewed from above, FIG. 3 is a bottom view of the lower vehicle body structure for a vehicle viewed from below, FIG. 4 is a bottom view of the lower vehicle body structure for a vehicle viewed from below with a battery and a battery frame removed, FIG. 5 is a sectional view showing a cross-section of the lower vehicle body structure taken along line V-V in FIG. 2, FIG.

Figure 7:
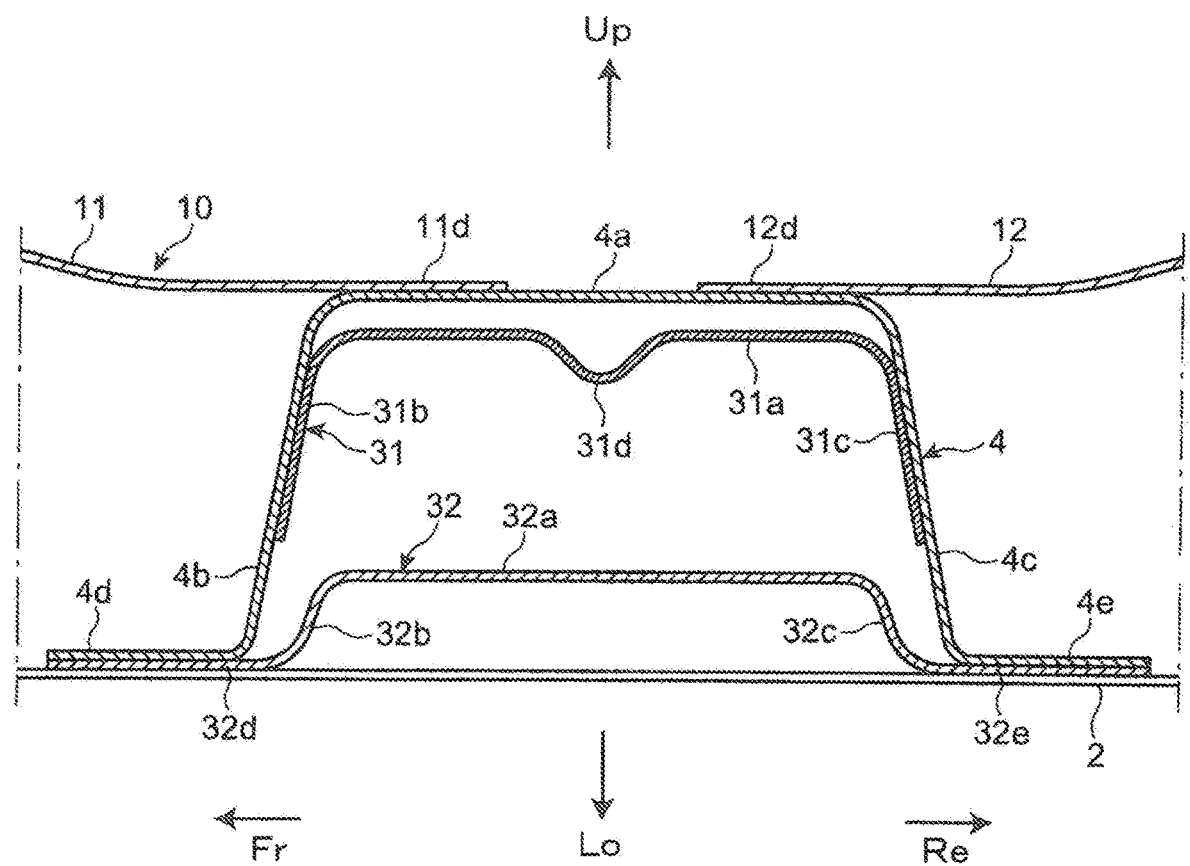
FIG. 7 is a sectional view showing a cross-section of the lower vehicle body structure taken along line VII-VII in FIG. 2.
Figure 8:
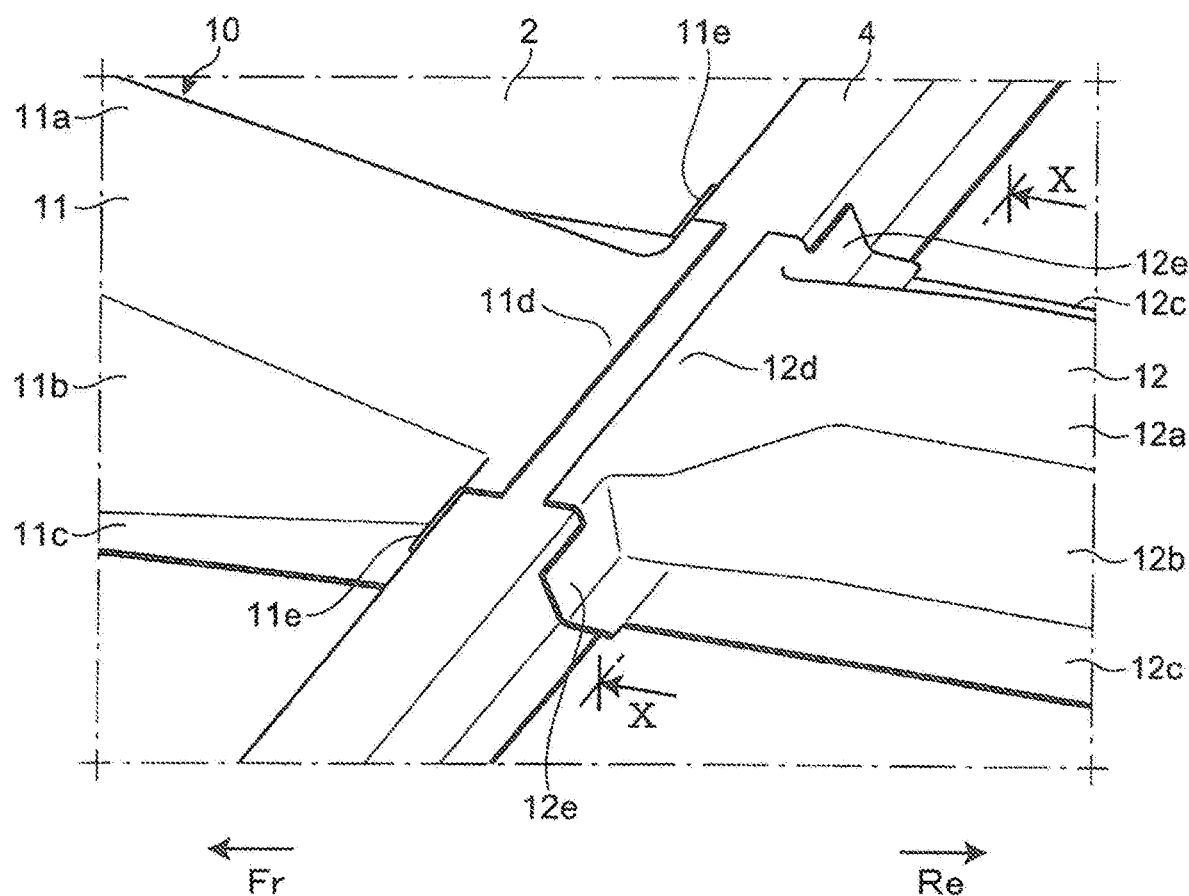
FIG. 8 is an enlarged view showing an enlarged part of a configuration of the lower vehicle body structure for a vehicle according to the embodiment.

6 is a sectional view showing a cross-section of the lower vehicle body structure taken along line VI-VI in FIG. 2, FIG. 7 is a sectional view showing a cross-section of the lower vehicle body structure taken along line VII-VII in FIG. 2, and FIG. 8 is an enlarged view showing an enlarged part of a configuration of the lower vehicle body structure for a vehicle.

A vehicle body 1 to which the lower vehicle body structure for a vehicle according to the embodiment is applied is a vehicle body of an electric car or the like, which includes a motor as a drive source which drives the vehicle and a battery which stores electric power to be supplied to the motor. As shown in FIGS. 1 to 8, the vehicle body 1 includes, in a lower part of the vehicle body, a floor panel 2 forming a floor surface of a vehicle compartment, a left and right pair of side sills 3 respectively joined to vehicle-widthwise both end portions of the floor panel 2 to extend in a front-rear direction of the vehicle body, and a plurality of cross-members which is disposed on an upper surface side of the floor panel 2 between the left and right pair of side sills 3 to extend in the vehicle width direction, specifically a first cross-member 4 and a second cross-member 5.

On the floor panel 2, a floor tunnel portion 10 is formed which extends in the front-rear direction of the vehicle body at the center in the vehicle width direction and protrudes to a vehicle body upper side. The floor tunnel portion 10 is divided by the first cross-members 4 in the front-rear direction of the vehicle body. The floor tunnel portion 10 includes a front side tunnel portion 11 arranged on the vehicle body front side of the first cross-member 4 and a rear side tunnel portion 12 arranged on the vehicle body rear side of the first cross-member 4.

The front side tunnel portion 11 includes an upper surface portion 11a, side surface portions 11b on both sides, and first flange portions 11c on both sides, and has a substantially hat-shaped cross-section. The first flange portions 11c on both sides are coupled to the floor panel 2 by welding or the like. The front side tunnel portion 11 includes, at its rear end portion, a second flange portion 11d extending from the upper surface portion 11a toward the vehicle body rear side and third flange portions 11e on both sides which extend respectively from the side surface portions 11b on both sides toward vehicle-widthwise outer sides. The second flange portion 11d and the third flange portion 11e on both sides are coupled to, on the vehicle body front side, the first cross-member 4 by welding or the like.

The rear side tunnel portion 12 includes an upper surface portion 12a, side surface portions 12b on both sides, and first flange portions 12c on both sides, and also has a substantially hat-shaped cross-section. The first flange portions 12c on both sides are coupled to the floor panel 2 by welding or the like. The rear side tunnel portion 12 includes, at its front end portion, a second flange portion 12d extending from the upper surface portion 12a toward the vehicle body front side and third flange portions 12e on both sides which extend respectively from the side surface portions 12b on both sides toward the vehicle-widthwise outer sides. The second flange portion 12d and the third flange portions 12e on both sides are coupled to the vehicle body rear side of the first cross-member 4 by welding or the like.

Figure 6:
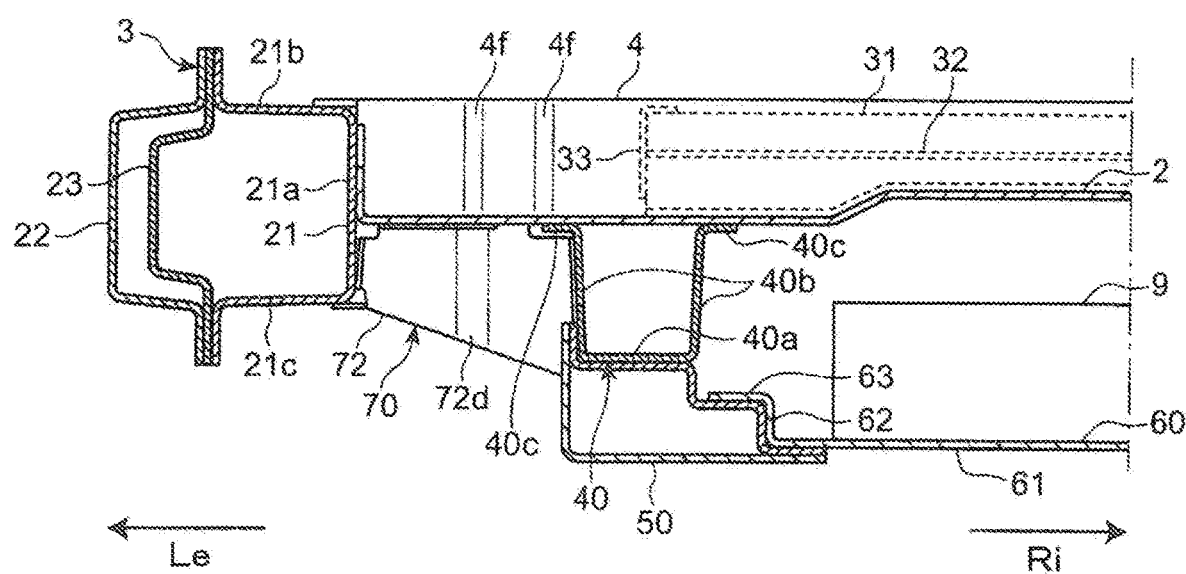
FIG. 6 is a sectional view showing a cross-section of the lower vehicle body structure taken along line VI-VI in FIG. 2.

As shown in FIGS. 5 and 6, the left and right side sills 3 each include a side sill inner 21 forming a vehicle inner side of the side sill 3, a side sill outer 22 forming a vehicle outer side of the side sill 3, and a side sill reinforcement 23 disposed between the side sill inner 21 and the side sill outer 22. In FIGS. 1 to 4, only the side sill inner 21 of the side sill 3 is shown.

The side sill inner 21 includes a vertical surface portion 21a extending in an up-down direction of the vehicle body, and an upper surface portion 21b and a lower surface portion 21c extending in a substantially horizontal direction toward the vehicle outer side from an upper end portion and a lower end portion of the vertical surface portion 21a, respectively. The side sill inner 21 has a substantially hat-shaped cross-section protruding to the vehicle inner side. The side sill reinforcement 23 and the side sill outer 22 have a substantially hat-shaped cross-section protruding to the vehicle outer side. The side sill inner 21, the side sill reinforcement 23, and the side sill outer 22 are overlapped at both of their end portions in the up-down direction of the vehicle body and coupled by welding or the like, resulting in the side sill 3 having a closed cross-section.

The first cross-member 4 and the second cross-member 5 are coupled to the upper surface side of the floor panel 2 by welding or the like so as to cross the floor tunnel portion 10. The first cross-member 4 and the second cross-member 5 are arranged spaced apart in the front-rear direction of the vehicle body. The first cross-member 4 is arranged on the vehicle body front side of the second cross-member 5.

In the present embodiment, the first cross-member 4 extends in the vehicle width direction between the left and right side sills 3 without being divided in the vehicle width direction. As shown in FIG. 7, the first cross-member 4 includes an upper surface portion 4a, a front surface portion 4b, a rear surface portion 4c, a front side flange portion 4d, and a rear side flange portion 4e. The first cross-member 4 has a substantially hat-shaped cross-section. The front surface portion 4b and the rear surface portion 4c extend from the vehicle-body front-side end portion and the vehicle-body rear-side end portion, respectively, of the upper surface portion 4a toward the vehicle body lower side. The front side flange portion 4d and the rear side flange portion 4e respectively extend from lower end portions of the front surface portion 4b and the rear surface portion 4c toward the vehicle body front side and the vehicle body rear side. The front side flange portion 4d and the rear side flange portion 4e are coupled to the floor panel 2 by welding or the like.

The first cross-member 4 has vehicle-widthwise both end portions coupled to the side sills 3 by welding or the like. The first cross-member 4 is joined, on its vehicle body front side and its vehicle body rear side at the center in the vehicle width direction, to the rear end portion of the front side tunnel portion 11 and to the front end portion of the rear side tunnel portion 12, respectively. As shown in FIG. 2, the second flange portion 11d and the third flange portions 11e on both sides of the front side tunnel portion 11 are coupled to the upper surface portion 4a and the front surface portion 4b, on the vehicle body front side, of the first cross-member 4 along the upper surface portion 4a and the front surface portion 4b, and the second flange portion 12d and the third flange portions 12e on both sides of the rear side tunnel portion 12 are coupled to the upper surface portion 4a and the rear surface portion 4c, on the vehicle body rear side, of the first cross-member 4 along the upper surface portion 4a and the rear surface portion 4c.

The first cross-member 4 also includes cross-member side fragile portions 4f provided on both sides in the vehicle width direction. The cross-member side fragile portions 4f are more fragile than the other parts of the first cross-member 4 against an impact load acting from the vehicle-widthwise outer side. The cross-member side fragile portion 4f is formed with recessed portions 4f (corresponding to second recessed portions) provided respectively at the front surface portion 4b and the rear surface portion 4c of the first cross-member 4. The recessed portions 4f are provided to extend in the up-down direction of the vehicle body along the front surface portion 4b and the rear surface portion 4c of the first cross-member 4 and also to dent so as to have a cross-sectionally arc shape toward the inner side of the first cross-member 4.

The recessed portions 4f respectively provided at the front surface portion 4b and the rear surface portion 4c of the first cross-member 4 are arranged at the same position in the vehicle width direction. The front surface portion 4b and the rear surface portion 4c of the first cross-member 4 are each provided with two recessed portions 4f, on both sides in the vehicle width direction, which are spaced apart in the vehicle width direction. The recessed portions 4f of the first cross-member 4 are provided to be positioned vehicle-widthwise outward of a side frame 40 to be described later as shown in FIG. 6.

Figure 9:
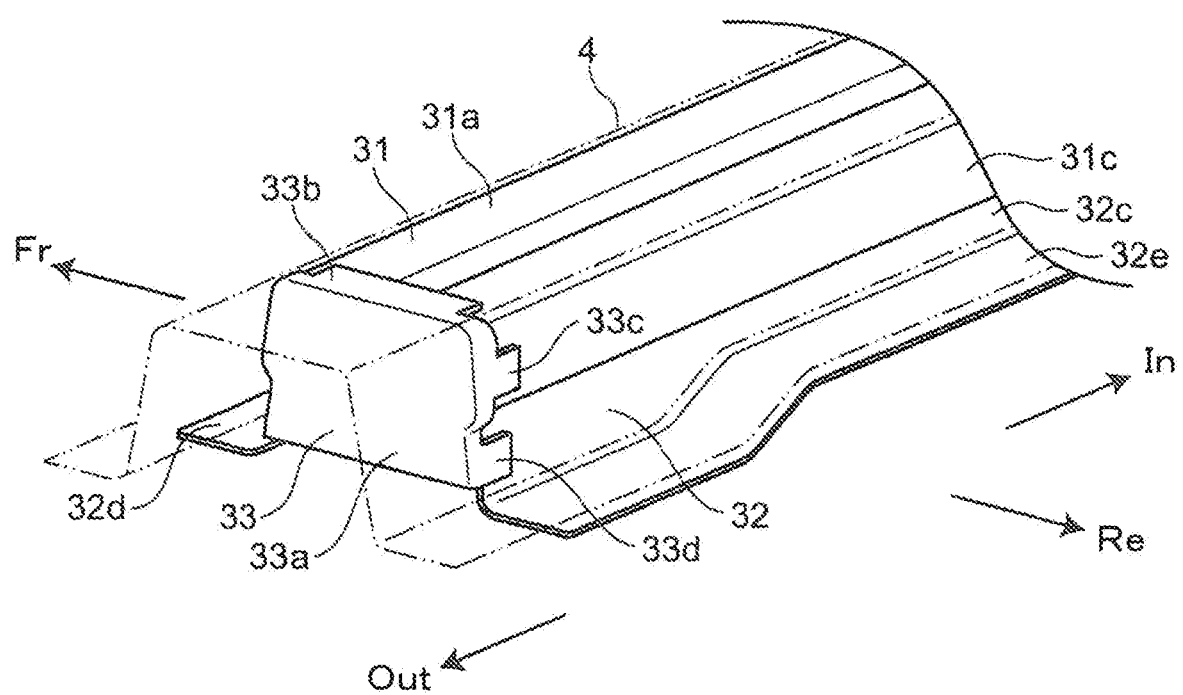
FIG. 9 is a view showing a reinforcement member disposed in a cross-member.

FIG. 9 is a view showing a reinforcement member disposed in the cross-member and in FIG. 9, the first cross-member is illustrated with chain double-dashed lines. As shown in FIG. 9, in the first cross-member 4, reinforcement members, specifically, a first reinforcement member 31 and a second reinforcement member 32 are disposed. The first reinforcement member 31 and the second reinforcement member 32 extend in the vehicle width direction which is an axial direction of the first cross-member 4, and are formed to be shorter in length in the vehicle width direction than the first cross-member 4.

As shown in FIG. 7, the first reinforcement member 31 includes an upper surface portion 31a, a front surface portion 31b, and a rear surface portion 31c, and has a substantially U-shaped cross-section. The upper surface portion 31a is arranged substantially in parallel to the upper surface portion 4a of the first cross-member 4. The front surface portion 31b and the rear surface portion 31c are arranged substantially along the front surface portion 4b and the rear surface portion 4c of the first cross-member 4 to extend from the vehicle-body front-side end portion and the vehicle-body rear-side end portion, respectively, of the upper surface portion 31a toward the vehicle body lower side. At the center of the upper surface portion 31a of the first reinforcement member 31 in the front-rear direction of the vehicle body, a bead portion 31d is formed which dents toward the vehicle body lower side so as to have a substantially triangular cross-section.

The second reinforcement member 32 is arranged on the vehicle body lower side of the first reinforcement member 31. The second reinforcement member 32 includes an upper surface portion 32a, a front surface portion 32b, a rear surface portion 32c, a front side flange portion 32d, and a rear side flange portion 32e, and has a substantially hat-shaped cross-section. The upper surface portion 32a is arranged substantially in parallel to the upper surface portion 4a of the first cross-member 4. The front surface portion 32b and the rear surface portion 32c are arranged spaced apart substantially in parallel to the front surface portion 4b and the rear surface portion 4c of the first cross-member 4 to extend from the vehicle-body front-side end portion and the vehicle-body rear-side end portion, respectively, of the upper surface portion 32a toward the vehicle body lower side. The front side flange portion 32d and the rear side flange portion 32e respectively extend from lower end portions of the front surface portion 32b and the rear surface portion 32c toward the vehicle body front side and the vehicle body rear side. The second reinforcement member 32 has the front side flange portion 32d and the rear side flange portion 32e coupled to the floor panel 2 together with the front side flange portion 4d and the rear side flange portion 4e of the first cross-member 4, respectively.

The first reinforcement member 31 and the second reinforcement member 32 are provided at the same position in the vehicle width direction inside the first cross-member 4. Linking members 33 are respectively provided at both end portions of the first reinforcement member 31 and the second reinforcement member 32 in the vehicle width direction. As shown in FIG. 9, the linking members link the first reinforcement member 31 and the second reinforcement member 32.

The linking members 33 each include a partition surface portion 33a and a first flange portion 33b, and, on its both sides, second flange portions 33c and third flange portions 33d. The partition surface portion 33a extends in a direction substantially perpendicular to the vehicle width direction that is the axial direction of the first cross-member 4 so as to section the inside of the first cross-member 4 in the vehicle width direction. The first flange portion 33b extends from an upper end portion of the partition surface portion 33a toward the vehicle-widthwise inner side. The second flange portions 33c extend from the vehicle body upper side at both end portions, in the front-rear direction of the vehicle body, of the partition surface portion 33a toward the vehicle-widthwise inner side. The third flange portions 33d extend from the vehicle body lower side at the both end portions, in the front-rear direction of the vehicle body, of the partition surface portion 33a toward the vehicle-widthwise inner side.

Then, the first flange portion 33b is coupled to the upper surface portion 31a of the first reinforcement member 31 by welding or the like. The second flange portions 33c on both the sides of the linking member 33 are respectively coupled to the front surface portion 31b and the rear surface portion 31c of the first reinforcement member 31 by welding or the like. The third flange portions 33d on both the sides of the linking member 33 are respectively coupled to the front surface portion 32b and the rear surface portion 32c of the second reinforcement member 32 by welding or the like. The first reinforcement member 31 and the second reinforcement member 32 have both end portions thereof in the vehicle width direction linked to each other by the linking members 33. The first reinforcement member 31 and the second reinforcement member 32 are disposed to extend between portions corresponding to the left and right side frames 40 in the vehicle width direction, i.e. extend from a position overlapping one side frame 40 in the vehicle width direction to a position overlapping the other side frame 40.

Figure 10:
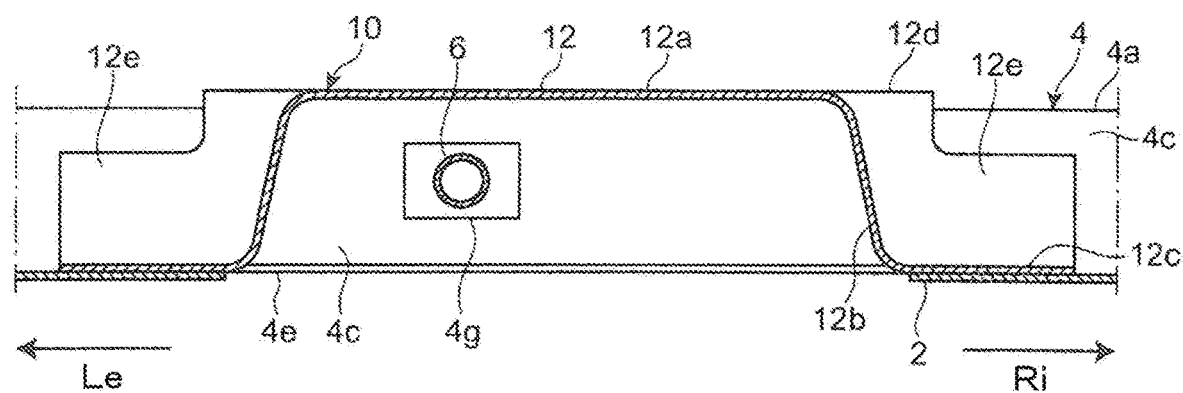
FIG. 10 is a sectional view showing a cross-section of a part of the configuration of the lower vehicle body structure taken along line X-X in FIG. 8.

FIG. 10 is a sectional view showing a cross-section of a part of the configuration of the lower vehicle body structure taken along line X-X in FIG. 8. As shown in FIG. 10, the first cross-member 4 also includes a piping routing portion which routes a piping 6 disposed on the vehicle body lower side of the floor tunnel portion 10 so as to extend in the front-rear direction of the vehicle body, the piping routing portion being provided at a joining portion of the first cross-member 4 and the floor tunnel portion 10. The joining portion is a portion which divides the floor tunnel portion 10 into the front side tunnel portion 11 and the rear side tunnel portion 12.

In the first cross-member 4, substantially rectangular opening portions 4g are formed, as the piping routing portions, in the front surface portion 4b and the rear surface portion 4c, respectively. Although the opening portion 4g formed in the rear surface portion 4c of the first cross-member 4 is shown in FIG. 10, the substantially rectangular opening portion 4g is formed also in the front surface portion 4b of the first cross-member 4 similarly to the rear surface portion 4c.

The opening portions 4g formed in the front surface portion 4b and the rear surface portion 4c of the first cross-member 4 are provided to allow the inside of the front side tunnel portion 11 and the inside of the rear side tunnel portion 12 to communicate with each other in the front-rear direction of the vehicle body and are formed such that the piping 6 such as piping for a cable or piping for a brake is arranged in the front-rear direction of the vehicle body through the front side tunnel portion 11, the first cross-member 4, and the rear side tunnel portion 12.

In a case where the opening portion 4g is formed as the piping routing portion in the first cross-member 4, when the first reinforcement member 31 or the second reinforcement member 32 is arranged at a position opposed to the opening portion 4g of the first cross-member 4, a substantially rectangular opening portion can be formed as the piping routing portion also in the first reinforcement member 31 or the second reinforcement member 32 so as to correspond to the opening portion 4g of the first cross-member 4. In place of a substantially rectangular opening portion, an opening portion having any other shape such as a circular may be formed as the piping routing portion.

Figure 11:
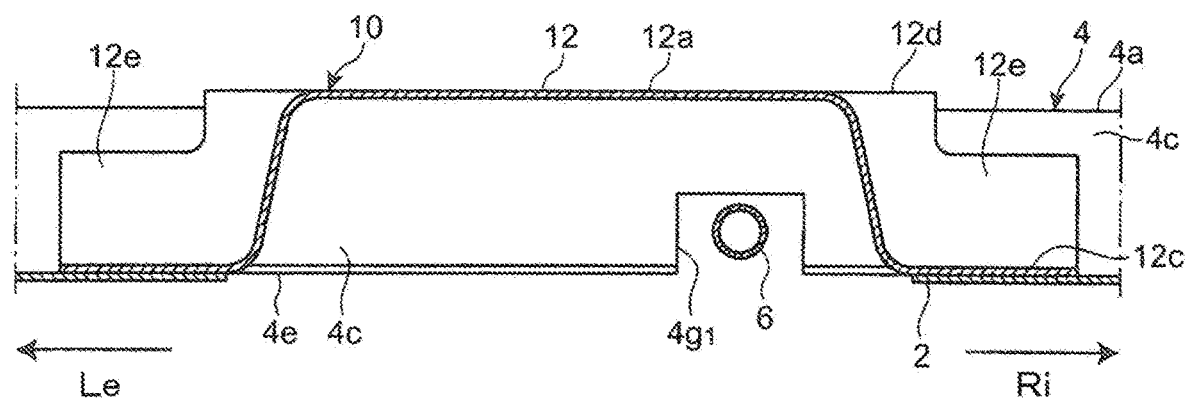
FIG. 11 is a view showing another piping routing portion provided in the cross-member.

FIG. 11 is a view showing another piping routing portion provided in the cross-member. As shown in FIG. 11, as a piping routing portion provided in the first cross-member 4, the front surface portion 4b and the rear surface portion 4c of the first cross-member 4 can be provided also with recessed portions $4g_1$ which substantially rectangularly and upwardly dent from lower end portions of the front surface portion 4b and the rear surface portion 4c of the first cross-member 4, respectively.

Also in such a case, the recessed portions $4g_1$ respectively formed in the front surface portion 4b and the rear surface portion 4c of the first cross-member 4 are provided to allow the inside of the front side tunnel portion 11 and the inside of the rear side tunnel portion 12 to communicate with each other in the front-rear direction of the vehicle body and are formed such that the piping 6 such as piping for a cable or piping for a brake is arranged in the front-rear direction of the vehicle body through the front side tunnel portion 11, the first cross-member 4, and the rear side tunnel portion 12.

Also in a case where the recessed portion $4g_1$ is formed as the piping routing portion in the first cross-member 4, when the first reinforcement member 31 or the second reinforcement member 32 is arranged at a position opposed to the recessed portion $4g_1$ of the first cross-member 4, a substantially rectangular recessed portion can be formed as the piping routing portion also in the first reinforcement member 31 or the second reinforcement member 32 so as to correspond to the recessed portion $4g_1$ of the first cross-member 4. In place of a substantially rectangular recessed portion, a recessed portion having any other shape such as a semi-circular may be formed as the piping routing portion.

As shown in FIGS. 1 and 2, the second cross-member 5 includes an upper surface portion 5a, a front surface portion 5b, a rear surface portion 5c, a front side flange portion 5d, and a rear side flange portion 5e, and also has a substantially hat-shaped cross-section. The front surface portion 5b and the rear surface portion 5c extend from the vehicle-body front-side end portion and the vehicle-body rear-side end portion, respectively, of the upper surface portion 5a toward the vehicle body lower side. The front side flange portion 5d and the rear side flange portion 5e respectively extend from lower end portions of the front surface portion 5b and the rear surface portion 5c toward the vehicle body front side and the vehicle body rear side. The front side flange portion 5d and the rear side flange portion 5e are coupled to the floor panel 2 by welding or the like.

The second cross-member 5 is divided in the vehicle width direction by the floor tunnel portion 10. Each of the vehicle-widthwise divisional second cross-members 5 has a vehicle-widthwise outer-side end portion coupled to the side sill 3 by welding or the like and a vehicle-widthwise inner-side end portion coupled to the floor tunnel portion 10, specifically, to the rear side tunnel portion 12, by welding or the like.

In each of the vehicle-widthwise divisional second cross-members 5, sheet rail attaching members 7 and 8 are disposed for attaching sheet rails (not shown) respectively to vehicle-widthwise outer and inner sides of the second cross-member 5, the vehicle-widthwise outer and inner sides being in the upper surface portion 5a.

The sheet rail attaching member 7 is disposed on the vehicle-widthwise outer side, and coupled to the second cross-member 5 and also to the side sill 3. The sheet rail attaching member 8 is disposed on the vehicle-widthwise inner side, and coupled to the second cross-member 5 and also to the floor tunnel portion 10, specifically, to the rear side tunnel portion 12.

In the vehicle body 1, the first cross-member 4 and the second cross-member 5 are arranged to overlap, in the front-rear direction of the vehicle body, a battery 9 disposed below the floor panel 2.

As shown in FIGS. 3 and 4, the vehicle body 1 includes, in a lower part of the vehicle body, the left and right pair of side frames 40, the battery 9, and a battery frame 50. The left and right pair of side frames 40 are disposed at a lower surface side of the floor panel 2 so as to be spaced apart in the vehicle width direction and extend in the front-rear direction of the vehicle body. The battery 9 is disposed below the floor panel 2 and between the left and right pair of side frames 40. The battery frame 50 supports the battery 9.

The side frame 40 is arranged between the floor tunnel portion 10 and the side sill 3 in the vehicle width direction. As shown in FIG. 6, the side frame 40 includes a lower surface portion 40a, and, on its both sides side, surface portions 40b and flange portions 40c, and has a substantially hat-shaped cross-section. The side surface portions 40b upwardly extend from vehicle-widthwise both end portions of the lower surface portion 40a. The flange portions 40c respectively extend outwardly from the side surface portions 40b on both the sides of the side frame 40. The flange portions 40c on both the sides of the side frame 40 are coupled to the lower surface side of the floor panel 2 by welding or the like. Thus, the side frame 40 has a closed cross-section.

The battery 9 extends in the front-rear direction of the vehicle body from a position more to the vehicle body front side than the first cross-member 4 to a position more to the vehicle body rear side than the second cross-member 5 and is attached to an upper surface side of a battery tray 60. As shown in FIG. 6, the battery tray 60 includes a base portion 61 to which the battery 9 is attached, a vertical wall portion 62 extending upward from a peripheral edge portion of the base portion 61, and a flange portion 63 extending outwardly from an upper end portion of the vertical wall portion 62, the flange portion 63 being attached to the battery frame 50.

As shown in FIG. 3, the battery frame 50 includes a front frame 51, a rear frame 52, and, on its both sides, lateral frames 53. The front frame 51 is arranged on the vehicle body front side to extend in the vehicle width direction. The rear frame 52 is arranged on the vehicle body rear side to extend in the vehicle width direction. The lateral frames 53 connect vehicle-widthwise both sides of the front frame 51 and vehicle-widthwise both sides of the rear frame 52 to extend in the front-rear direction of the vehicle body. The lateral frames 53 on both the sides of the battery frame 50 are respectively arranged on vehicle body lower sides of the left and right side frames 40 and attached to the side frames 40.

Figure 12:
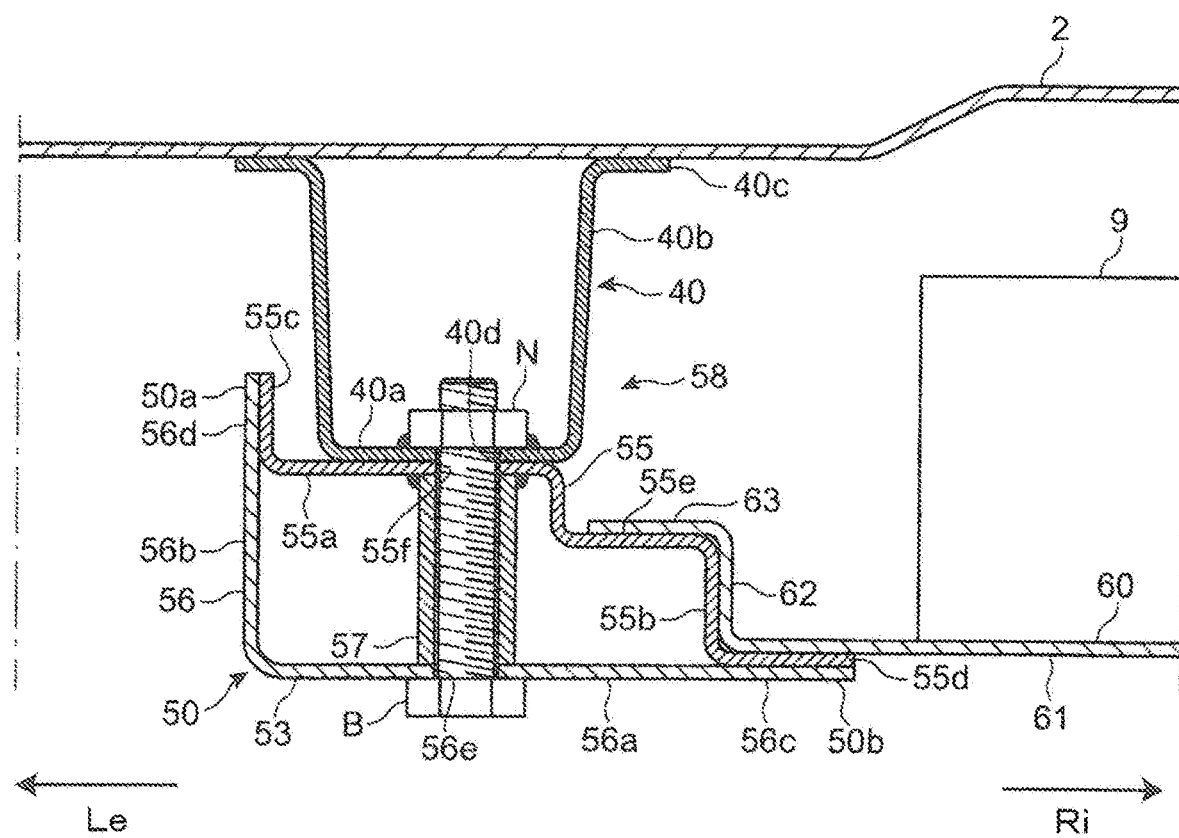
FIG. 12 is a sectional view showing a cross-section of a part of the configuration of the lower vehicle body structure taken along line XII-XII in FIG. 3.

FIG. 12 is a sectional view showing a cross-section of the vehicle body taken along line XII-XII in FIG. 3. The front frame 51, the rear frame 52, and the lateral frames 53 on both sides are each configured with an upper frame 55 forming a vehicle body upper side of the battery frame 50 and a lower frame 56 forming a vehicle body lower side of the battery frame 50 as shown in FIG. 12.

The upper frame 55 includes an upper surface portion 55a and an inner surface portion 55b, and has a substantially L-shaped cross-section. The upper surface portion 55a extends in a direction substantially perpendicular to the up-down direction of the vehicle body. The inner surface portion 55b is arranged on the vehicle inner side and extends in the up-down direction of the vehicle body. The upper frame 55 also includes flange portions 55c and 55d extending respectively from the upper surface portion 55a and the inner surface portion 55b in a substantially vertical direction and in a substantially horizontal direction.

On the other hand, the lower frame 56 includes a lower surface portion 56a and an outer surface portion 56b and has a substantially L-shaped cross-section. The lower surface portion 56a extends in a direction substantially perpendicular to the up-down direction of the vehicle body. The outer surface portion 56b is arranged on the vehicle outer side and extends in the up-down direction of the vehicle body. The lower frame 56 also includes flange portions 56c and 56d extending from the lower surface portion 56a and the outer surface portion 56b in a substantially horizontal direction and in a substantially vertical direction, respectively.

The battery frame 50 is formed to have a closed cross-section including a flange portion 50a extending in the substantially vertical direction and a flange portion 50b extending in the substantially horizontal direction by superposing and coupling the flange portions 55c and 55d of the upper frame 55 and the flange portions 56d and 56c of the lower frame 56 by welding or the like.

In the battery frame 50, a stepped portion 55e is formed on the vehicle-widthwise inner side of the upper surface portion 55a of the upper frame 55 so as to be recessed to the vehicle body lower side. The flange portion 63 of the battery tray 60 is attached to the stepped portion 55e of the battery frame 50, and the battery 9 is supported by the battery frame 50.

The battery frame 50, specifically, the lateral frame 53, is arranged substantially along the side frame 40 and is connected to the side frame 40. As shown in FIG. 12, in a frame connection portion 58 which connects the battery frame 50 and the side frame 40, the side frame 40 is formed with a bolt insertion hole 40d in the lower surface portion 40a and a nut N is fixed to an upper surface side of the lower surface portion 40a so as to correspond to the bolt insertion hole 40d by welding or the like.

On the other hand, in the battery frame 50, specifically, in the lateral frame 53, the bolt insertion hole 55f is formed in the upper surface portion 55a of the upper frame 55 and a bolt insertion hole 56e is formed in the lower surface portion 56a of the lower frame 56, and a tubular member 57 formed to be tubular in which a bolt is inserted is fixed to a lower surface side of the upper surface portion 55a of the upper frame 55 by welding or the like.

Then, with the upper surface portion 55a of the upper frame 55 of the battery frame 50 being arranged below the lower surface portion 40a of the side frame 40, a bolt B is screwed with the nut N from below the battery frame 50 to connect the battery frame 50 and the side frame 40. The frame connection portion 58 includes a plurality of frame connection portions provided in the lateral frame 53 in the front-rear direction of the vehicle body, the frame connection portions in the vehicle body 1 being arranged more to the vehicle body front side than the first cross-member 4, being arranged between the first and second cross-members 4 and 5, and being arranged more to the vehicle body rear side than the second cross-member 5 in the front-rear direction of the vehicle body.

As shown in FIGS. 3 and 4, the vehicle body 1 is also provided with a plurality of impact absorption members 70 and 80 disposed, in a lower portion of the vehicle body, at the lower surface side of the floor panel 2 to extend in the vehicle width direction between the side frame 40 and the side sill 3. The impact absorption members 70 and 80, which absorb impact loads input from the vehicle-widthwise outer side at the time of side-on collision, are joined to the side frame 40 and the side sill 3.

In the vehicle body 1, the first impact absorption members 70 and the second impact absorption members 80 are disposed to be spaced apart in the front-rear direction of the vehicle body, the first impact absorption members 70 being arranged more to the vehicle body front side than the second impact absorption members 80. The first impact absorption member 70 is disposed at a position overlapping the first cross-member 4 in the front-rear direction of the vehicle body, and the second impact absorption member 80 is disposed at a position overlapping the second cross-member 5 in the front-rear direction of the vehicle body. The first impact absorption members 70 and the second impact absorption members 80 are disposed at vehicle-widthwise both sides of the vehicle body 1, respectively.

Figure 13:
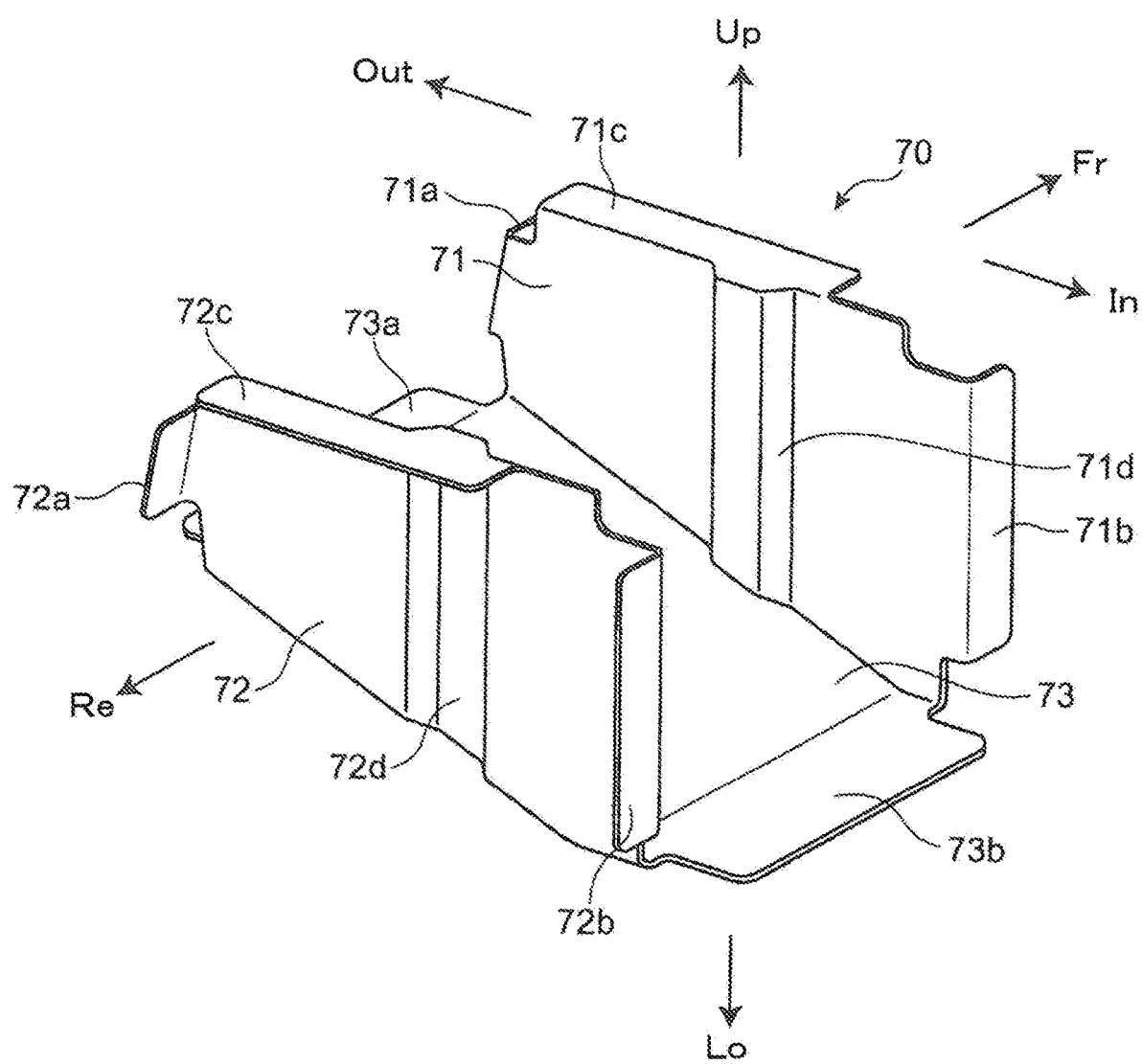
FIG. 13 is a perspective view showing an impact absorption member.

FIG. 13 is a perspective view showing an impact absorption member, showing the first impact absorption member disposed on the vehicle body left side. As shown in FIG. 13, the first impact absorption member 70 includes side surface portions 71 and 72 on its both sides and a bottom surface portion 73, and has a substantially U-shaped cross-section. The side surface portions 71 and 72 are arranged substantially in parallel and spaced apart from each other in the front-rear direction of the vehicle body to extend in a direction substantially perpendicular to the front-rear direction of the vehicle body. The bottom surface portion 73 links vehicle-body lower-side end portions of the side surface portions 71 and 72 on both the sides of the first impact absorption member 70 to extend in the front-rear direction of the vehicle body.

The side surface portions 71 and 72 on both the sides of the first impact absorption member 70 are formed to have substantially the same shape, i.e. a substantially trapezoidal shape tapered from the vehicle-widthwise inner side toward the vehicle-widthwise outer side, with vehicle-widthwise outer-side end portions being formed according to the side sill 3, specifically, according to the vertical surface portion 21a of the side sill inner 21 and with vehicle-widthwise inner-side end portions being formed according to the side surface portions 40b of the side frame 40.

The side surface portion 71 arranged on the vehicle body front side includes an outer side flange portion 71a provided at a vehicle-widthwise outer-side end portion to extend toward the vehicle body front side, an inner side flange portion 71b provided at a vehicle-widthwise inner-side end portion to extend toward the vehicle body front side, and an upper side flange portion 71c provided at a vehicle-body upper-side end portion to extend toward the vehicle body front side.

The side surface portion 72 arranged on the vehicle body rear side also includes an outer side flange portion 72a provided at a vehicle-widthwise outer-side end portion to extend toward the vehicle body rear side, an inner side flange portion 72b provided at a vehicle-widthwise inner-side end portion to extend toward the vehicle body rear side, and an upper side flange portion 72c provided at a vehicle-body upper-side end portion to extend toward the vehicle body rear side.

The bottom surface portion 73 includes an outer side flange portion 73a provided at a vehicle-widthwise outer-side end portion to extend toward the vehicle-widthwise outer side and an inner side flange portion 73b provided at a vehicle-widthwise inner-side end portion to extend toward the vehicle-widthwise inner side.

In the first impact absorption member 70, the side surface portions 71 and 72 on both sides are formed to be tapered from the vehicle-widthwise inner side toward the vehicle-widthwise outer side and vehicle-body lower-side end portions of the side surface portions 71 and 72 on both sides are linked to each other by the bottom surface portion 73 so as to be tapered from the vehicle-widthwise inner side toward the vehicle-widthwise outer side.

The first impact absorption member 70 also includes impact absorption member side fragile portions 71d and 72d provided in the side surface portions 71 and 72 on both sides, respectively, the impact absorption member side fragile portions being more fragile to, when an impact load acts from the vehicle-widthwise outer side, the impact load input from the vehicle-widthwise outer side than other portions of the first impact absorption member 70.

The impact absorption member side fragile portions 71d and 72d are configured with recessed portions 71d and 72d (corresponding to first recessed portions) respectively provided on the side surface portions 71 and 72 (corresponding to a front surface portion and a rear surface portion of the first impact absorption member70 shown in FIGS. 4 and 13) on both sides. The recessed portions 71d and 72d are provided to extend in the up-down direction of the vehicle body along the side surface portions 71 and 72, respectively, and to dent toward the inner side of the first impact absorption member 70 so as to have a substantially trapezoidal cross-section.

The recessed portions 71d and 72d respectively provided on the side surface portions 71 and 72 on both sides are provided at the same position in the vehicle width direction and also provided preferably at a position overlapping with each other in the vehicle width direction with the recessed portions 4f as the cross-member side fragile portion 4f provided in the first cross-member 4 when the first impact absorption member 70 is disposed between the side sill 3 and the side frame 40 as shown in FIG. 6.

The first impact absorption member 70 is coupled to the floor panel 2, the side sill 3 and the side frame 40, with the upper side flange portions 71c and 72c provided in the side surface portions 71 and 72 on both sides being coupled to the lower surface side of the floor panel 2 by welding or the like, the outer side flange portions 71a and 72a provided in the side surface portions 71 and 72 on both sides and the outer side flange portion 73a provided in the bottom surface portion 73 being coupled to the side sill 3 by welding or the like, and the inner side flange portions 71b and 72b provided in the side surface portions 71 and 72 on both sides and the inner side flange portion 73b provided in the bottom surface portion 73 being coupled to the side frame 40 by welding or the like.

Specifically, the outer side flange portions 71a and 72a provided in the side surface portions 71 and 72 on both sides are coupled to the vertical surface portions 21a of the side sill inners 21, the outer side flange portion 73a provided in the bottom surface portion 73 is coupled to the lower surface portion 21c of the side sill inner 21, the inner side flange portions 71b and 72b provided in the side surface portions 71 and 72 on both sides are coupled to the side surface portions 40b of the side frames 40, and the inner side flange portion 73b provided in the bottom surface portion 73 is coupled to the lower surface portion 40a of the side frame 40.

The second impact absorption member 80 is similarly formed to the first impact absorption member 70 except that a recessed portion as an impact absorption member side fragile portion is not provided at the side surface portions on the both sides. The second impact absorption member 80, which is disposed at a position overlapping the second cross-member 5 in the front-rear direction of the vehicle body and disposed at the lower surface side of the floor panel 2 between the side sill 3 and the side frame 40, is coupled to the floor panel 2, the side sill 3 and the side frame 40.

As shown in FIG. 5, the battery frame 50 is formed not to interfere with the impact absorption members 70 and 80 by cutting out the flange portion 50a so as to correspond to a part in which the impact absorption members 70 and 80 and the side frame 40 are joined.

When an impact load acts on the side sill 3 in thus configured vehicle body 1 from the vehicle-widthwise outer side at the time of side-on collision (side-on collision with a pole), the impact load input to the side sill 3 is transmitted to the first impact absorption member 70 and the first cross-member 4 and the impact load is absorbed by the first impact absorption member 70 arranged more to the vehicle outer side than the side frame 40 and by the first cross-member 4.

Additionally, since the reinforcement members 31 and 32 are disposed in the first cross-member 4 over portions corresponding to the left and right side frames 40 in the vehicle width direction, deformation of the first cross-member 4 can be suppressed between the side frames 40 in the vehicle width direction.

Further, since the first impact absorption member 70 and the first cross-member 4 are disposed at a position overlapping with each other in the front-rear direction of the vehicle body, when an impact load acts on the side sill 3, the first impact absorption member 70 and the first cross-member 4 effectively suppress deformation of the vehicle body 1 between the side frames 40 in the vehicle width direction.

While in the present embodiment, the second cross-member 5 is provided to be divided in the vehicle width direction by the floor tunnel portion 10, the second cross-member may extend in the vehicle width direction between the left and right side sills 3 while diving the floor tunnel portion 10 without being divided in the vehicle width direction similarly to the first cross-member 4.

In such a case, similarly to the first cross-member 4, in the second cross-member 5, the first reinforcement member 31 and the second reinforcement member 32 are disposed and also the linking members 33 is disposed which links the first reinforcement member 31 and the second reinforcement member 32.

Also, the second impact absorption member 80 is formed in the same manner as the first impact absorption member 70 in which recessed portions are provided as impact absorption member side fragile portions at side surface portions on both sides, and the impact absorption member side fragile portions provided in the second impact absorption member 80 are preferably provided at positions overlapping in the vehicle width direction with cross-member side fragile portions provided in the second cross-member 5.

While also in the present embodiment, the two reinforcement members 31 and 32 are disposed in the first cross-member 4 so as to extend over portions corresponding to the left and right side frames 40 in the vehicle width direction, only one of the two reinforcement members 31 and 32 can be disposed in the first cross-member 4.

Thus, the lower vehicle body structure for a vehicle according to the present embodiment includes the battery 9 disposed below the floor panel 2 and between the side frames 40; the left and right side sills 3 arranged on the vehicle-widthwise outer sides of the side frames 40; the cross-member 4 disposed on the upper surface side of the floor panel 2 and between the side sills 3; the impact absorption member 70 which is disposed at the lower surface side of the floor panel 2 and at a position overlapping the cross-member 4 in the front-rear direction of the vehicle body to extend between the side frames 40 and the side sills 3; and the reinforcement members 31 and 32 disposed in the cross-member 4 to extend in the vehicle width direction between the portions corresponding to the left and right side frames 40.

When an impact load acts on the side sill 3 at the time of side-on collision with a utility pole (an electric pole) or the like (side-on collision with a pole), this arrangement allows the impact absorption member 70 to absorb the impact load input to the impact absorption member 70 from the side sill 3 to protect the battery 9. Also, the reinforcement members 31 and 32 can increase rigidity of the cross-member 4 between the side frames 40 in the vehicle width direction, and the impact load input from the side sill 3 to the cross-member 4 can be transmitted to each portion of the vehicle body on the opposite side to suppress deformation of the cross-member 4 between the side frames 40 in the vehicle width direction and protect the battery 9. Further, the impact absorption member 70 and the cross-member 4 are disposed at a position overlapping with each other in the front-rear direction of the vehicle body. Therefore, when an impact load acts on the side sill 3, the impact absorption member 70 and the cross-member 4 effectively suppress deformation of the vehicle body between the side frames 40 in the vehicle width direction, thereby protecting the battery 9. Accordingly, in a vehicle in which a battery is disposed below a floor panel, battery protection performance at the time of side-on collision can be improved.

Also, the impact absorption member 70 is formed to be tapered from the vehicle-widthwise inner side toward the vehicle-widthwise outer side. When an impact load acts on the side sill 3 at the time of side-on collision, this arrangement enables the impact load input from the side sill 3 to be distributed by the impact absorption member 70 from the vehicle-widthwise outer side toward the vehicle-widthwise inner side so as to be transmitted to the side frame 40.

Additionally, the impact absorption member 70 includes the impact absorption member side fragile portions 71d and 72d. The cross-member 4 includes the cross-member side fragile portions 4f on a more vehicle-widthwise outer side than the side frame 40 in the vehicle width direction. When an impact load is input from the side sill 3 to each of the impact absorption member 70 and the cross-member 4, this arrangement enables the impact absorption member 70 and the cross-member 4 to crush and deform with the impact absorption member side fragile portions 71d and 72d and the cross-member side fragile portion 4f as start points, thereby absorbing collision energy.

Also, the impact absorption member side fragile portions 71d and 72d and the cross-member side fragile portions 4f are provided at positions overlapping with each other in the vehicle width direction. This arrangement enables the impact absorption member 70 and the cross-member 4 to crush and deform at the same position in the vehicle width direction, thus absorbing collision energy.

The plurality of cross-members 4 and 5 is further provided which is arranged to overlap the battery 9 in the front-rear direction of the vehicle body, and by disposing the plurality of impact absorption members 70 and 80 at positions overlapping the plurality of cross-members 4 and 5 in the front-rear direction of the vehicle body so as to extend in the vehicle width direction between the side frame 40 and the side sill 3, protection performance for the battery 9 can be improved more efficiently.

While in the present embodiment, no reinforcement member is provided in the side sill 3, a reinforcement member which sections the inside of the side sill 3 can be disposed, within the side sill 3 in the joining portion between the cross-members 4 and 5 and the side sill 3, at a position overlapping the cross-members 4 and 5 in the front-rear direction of the vehicle body.

The present disclosure is not limited to the above-described embodiments but allows for various improvements and design changes without departing from the gist of the present disclosure.

CONCLUSION OF THE PRESENT DISCLOSURE

A lower vehicle body structure for a vehicle according to one aspect of the present disclosure includes a floor panel forming a floor surface of a vehicle compartment; a left and right pair of side frames disposed at a lower surface side of the floor panel so as to be spaced apart in a vehicle width direction and extending in a front-rear direction of the vehicle body; a battery disposed below the floor panel and between the left and right pair of side frames; a left and right pair of side sills respectively joined to vehicle-widthwise both end portions of the floor panel and arranged on vehicle-widthwise outer sides of the left and right pair of side frames to extend in the front-rear direction of the vehicle body; a cross-member disposed on an upper surface side of the floor panel to extend in the vehicle width direction between the left and right pair of side sills; an impact absorption member which is disposed at the lower surface side of the floor panel and at a position overlapping the cross-member in the front-rear direction of the vehicle body to extend in the vehicle width direction between the side frames and the side sills and is also joined to the side frames and the side sills to absorb an impact load input from the vehicle-widthwise outer side; and a reinforcement member disposed in the cross-member to extend in the vehicle width direction between portions of the cross-member, which correspond to the left and right pair of side frames in the vehicle width direction.

In the lower vehicle body structure for a vehicle according to the above aspect, when an impact load acts on the side sill at the time of side-on collision with a utility pole or the like (side-on collision with a pole), the impact absorption member absorbs the impact load input to the impact absorption member from the side sill to protect the battery.

Also, in the lower vehicle body structure for a vehicle according to the above aspect, the reinforcement members can increase rigidity of the cross-member between the side frames in the vehicle width direction, and the impact load input from the side sill to the cross-member can be transmitted to each portion of the vehicle body on the opposite side to suppress deformation of the cross-member between the side frames in the vehicle width direction and protect the battery.

Further, in the lower vehicle body structure for a vehicle according to the above aspect, since the impact absorption member and the cross-member are disposed at a position overlapping with each other in the front-rear direction of the vehicle body, when an impact load acts on the side sill, the impact absorption member and the cross-member effectively suppress deformation of the vehicle body between the side frames in the vehicle width direction, thereby protecting the battery. Accordingly, in a vehicle in which a battery is disposed below a floor panel, battery protection performance at the time of side-on collision can be improved.

In the lower vehicle body structure for a vehicle according to another aspect of the present disclosure, according to the aspect, the impact absorption member is formed to be tapered from the vehicle-widthwise inner side toward the vehicle-widthwise outer side.

In the lower vehicle body structure for a vehicle according to the above aspect, forming the impact absorption member to be tapered from the vehicle-widthwise inner side toward the vehicle-widthwise outer side makes it possible, when an impact load acts on the side sill at the time of side-on collision, to distribute the impact load input from the side sill by the impact absorption member from the vehicle-widthwise outer side toward the vehicle-widthwise inner side so as to be transmitted to the side frame, thereby obtaining the above effect efficiently.

In the lower vehicle body structure for a vehicle according to still another aspect of the present disclosure, according to the above aspect, the impact absorption member includes impact absorption member side fragile portions which are fragile to an impact load input from the vehicle-widthwise outer side, and the cross-member includes cross-member side fragile portions which are fragile to an impact load input from the vehicle-widthwise outer side and are provided on vehicle-widthwise outer sides of the side frame in the vehicle width direction.

In the lower vehicle body structure for a vehicle according to the above aspect, since the impact absorption member includes the impact absorption member side fragile portions and the cross-member includes the cross-member side fragile portions on the more vehicle-widthwise outer side than the side frame in the vehicle width direction, when an impact load is input from the side sill to each of the impact absorption member and the cross-member, the impact absorption member and the cross-member crush and deform with the impact absorption member side fragile portions and the cross-member side fragile portion as start points, thus absorbing collision energy.

In the lower vehicle body structure for a vehicle according to yet another aspect of the present disclosure, according to the above aspect, the impact absorption member side fragile portions and the cross-member side fragile portions are provided at positions overlapping with each other in the vehicle width direction.

In the lower vehicle body structure for a vehicle according to the above aspect, provision of the impact absorption member side fragile portions and the cross-member side fragile portions at positions overlapping with each other in the vehicle width direction enables the impact absorption member and the cross-member to crush and deform at the same position in the vehicle width direction, thus efficiently absorbing collision energy.

In the lower vehicle body structure for a vehicle according to a yet another aspect of the present disclosure, according to the above aspect, the cross-member includes a plurality of cross-members disposed on the upper surface side, the plurality of cross-members being arranged to overlap with the battery in the front-rear direction of the vehicle body and being arranged to be spaced apart in the front-rear direction of the vehicle body, and the impact absorption member includes a plurality of impact absorption members disposed at positions overlapping the plurality of cross-members in the front-rear direction of the vehicle body.

In the lower vehicle body structure for a vehicle according to the above aspect, the plurality of cross-members is provided which is arranged to overlap the battery in the front-rear direction of the vehicle body, and by disposing the plurality of impact absorption members at positions overlapping the plurality of cross-members in the front-rear direction of the vehicle body so as to extend in the vehicle width direction between the side frame and the side sill, battery protection performance can be improved more efficiently.

In the lower vehicle body structure for a vehicle according to each of the above respective aspects, in a vehicle in which a battery is disposed below a floor panel, battery protection performance at the time of side-on collision can be improved.

In the lower vehicle body structure for a vehicle according to the above aspect, the impact absorption member side fragile portions are configured with first recessed portions which are provided on a front surface portion and a rear surface portion of the impact absorption member respectively so that the first recessed portions extend in the up-down direction of the vehicle body and dent toward an inner side of the impact absorption member respectively, and the cross-member side fragile portions are configured with second recessed portions which are provided on a front surface portion and a rear surface portion of the cross-member respectively so that the second recessed portions extend in the up-down direction of the vehicle body and dent toward an inner side of the cross-member respectively.

The invention claimed is:

1. A lower vehicle body structure for a vehicle, comprising:
   a floor panel forming a floor surface of a vehicle compartment;
   a left and right pair of side frames disposed at a lower surface side of the floor panel so as to be spaced apart in a vehicle width direction and extending in a front-rear direction of the vehicle body;
   a battery disposed below the floor panel and between the left and right pair of side frames;
   a left and right pair of side sills respectively joined to vehicle-widthwise both end portions of the floor panel and arranged on vehicle-widthwise outer sides of the left and right pair of side frames to extend in the front-rear direction of the vehicle body;

a cross-member disposed on an upper surface side of the floor panel to extend in the vehicle width direction between the left and right pair of side sills;

an impact absorption member which is disposed at the lower surface side of the floor panel and at a position overlapping the cross-member in the front-rear direction of the vehicle body to extend in the vehicle width direction between the side frames and the side sills and is also joined to the side frames and the side sills to absorb an impact load input from the vehicle-widthwise outer side; and a reinforcement member disposed in the cross-member to extend in the vehicle width direction between portions of the cross-member, which correspond to the left and right pair of side frames in the vehicle width direction, wherein the impact absorption member includes impact absorption member side fragile portions which are fragile to an impact load input from the vehicle-widthwise outer side, and the cross- member includes cross-member side fragile portions which are fragile to an impact load input from the vehicle-widthwise outer side and are provided on vehicle-widthwise outer sides of the side frames in the vehicle width direction, the impact absorption member side fragile portions and the cross-member side fragile portions are provided at positions overlapping with each other in the vehicle width direction, and the impact absorption member side fragile portions are configured with first recessed portions which are provided on a front surface portion and a rear surface portion of the impact absorption member respectively so that the first recessed portions extend in the up-down direction of the vehicle body and dent toward an inner side of the impact absorption member respectively, and the cross-member side fragile portions are configured with second recessed portions which are provided on a front surface portion and a rear surface portion of the cross-member respectively so that the second recessed portions extend in the up-down direction of the vehicle body and dent toward an inner side of the cross-member respectively.

2. The lower vehicle body structure for a vehicle according to claim 1, wherein the cross-member includes a plurality of cross-members disposed on the upper surface side, the plurality of cross-members being arranged to overlap with the battery in the front-rear direction of the vehicle body and being arranged to be spaced apart in the front-rear direction of the vehicle body, and the impact absorption member includes a plurality of impact absorption members disposed at positions overlapping the plurality of cross-members in the front-rear direction of the vehicle body.

3. A lower vehicle body structure for a vehicle, comprising:

a floor panel forming a floor surface of a vehicle compartment;

a left and right pair of side frames disposed at a lower surface side of the floor panel so as to be spaced apart in a vehicle width direction and extending in a front-rear direction of the vehicle body;

a battery disposed below the floor panel and between the left and right pair of side frames;

a left and right pair of side sills respectively joined to vehicle-widthwise both end portions of the floor panel and arranged on vehicle-widthwise outer sides of the left and right pair of side frames to extend in the front-rear direction of the vehicle body;

a cross-member disposed on an upper surface side of the floor panel to extend in the vehicle width direction between the left and right pair of side sills;

an impact absorption member which is disposed at the lower surface side of the floor panel and at a position overlapping the cross-member in the front-rear direction of the vehicle body to extend in the vehicle width direction between the side frames and the side sills and is also joined to the side frames and the side sills to absorb an impact load input from the vehicle-widthwise outer side; and a reinforcement member disposed in the cross-member to extend in the vehicle width direction between portions of the cross-member, which correspond to the left and right pair of side frames in the vehicle width direction, wherein each of the pair of side frames has a closed cross-section extending in the front-rear direction of the vehicle body, and the reinforcement member extends from a position where one end portion of the reinforcement member in the vehicle width direction overlaps an intermediate portion of a bottom surface of the one side frame in the vehicle width direction to a position where the other end portion of the reinforcement member in the vehicle width direction overlaps an intermediate portion of a bottom surface of the other side frame in the vehicle width direction.

4. The lower vehicle body structure for a vehicle according to claim 3, wherein the impact absorption member includes impact absorption member side fragile portions which are fragile to an impact load input from the vehicle-widthwise outer side, and the cross-member includes cross-member side fragile portions which are fragile to an impact load input from the vehicle-widthwise outer side and are provided on vehicle-widthwise outer sides of the side frames in the vehicle width direction.

5. The lower vehicle body structure for a vehicle according to claim 4, wherein the impact absorption member side fragile portions and the cross-member side fragile portions are provided at positions overlapping with each other in the vehicle width direction.

6. The lower vehicle body structure for a vehicle according to claim 3, wherein the cross-member includes a plurality of cross-members disposed on the upper surface side, the plurality of cross-members being arranged to overlap with the battery in the front-rear direction of the vehicle body and being arranged to be spaced apart in the front-rear direction of the vehicle body, and the impact absorption member includes a plurality of impact absorption members disposed at positions overlapping the plurality of cross-members in the front-rear direction of the vehicle body.

7. The lower vehicle body structure for a vehicle according to claim 3, wherein the reinforcement member is disposed inside the cross member, is formed to be shorter in length in the vehicle width direction than the cross-member, and includes: an upper surface portion extending in the vehicle width direction; and a front surface portion and a rear surface portion each extending downward from the upper surface portion, and linking members each coupled to the front surface portion and the rear surface portion of the reinforcement member so as to section the inside of the cross-member in the vehicle width direction are respectively provided at both end portions of the reinforcement member in the vehicle width direction.

* * * * *